United States Patent [19]
Oki

[11] Patent Number: 5,870,595
[45] Date of Patent: Feb. 9, 1999

[54] CLOCK-SUPPLY CONTROL SYSTEM OF DIGITAL-SIGNAL PROCESSORS

[75] Inventor: Masashi Oki, Tokyo, Japan

[73] Assignee: Mitsubishi Denki Kabushiki Kaisha, Tokyo, Japan

[21] Appl. No.: 889,736

[22] Filed: Jul. 8, 1997

[30] Foreign Application Priority Data

Feb. 27, 1997 [JP] Japan ................................. 9-044294

[51] Int. Cl.$^6$ ....................................................... G06F 1/10
[52] U.S. Cl. ............................................................ 395/560
[58] Field of Search .................................... 395/555, 559, 395/560, 750.04, 750.06

[56] References Cited

U.S. PATENT DOCUMENTS

| | | | |
|---|---|---|---|
| 5,021,950 | 6/1991 | Nishikawa | 395/299 |
| 5,452,434 | 9/1995 | MacDonald | 395/560 |
| 5,546,568 | 8/1996 | Bland et al. | 395/560 X |
| 5,754,883 | 5/1998 | Lim et al. | 395/750.04 X |
| 5,765,003 | 6/1998 | MacDonald et al. | 395/750.04 |

FOREIGN PATENT DOCUMENTS 7-129272  5/1995  Japan .

*Primary Examiner*—Thomas M. Heckler
*Attorney, Agent, or Firm*—Burns, Doane, Swecker & Mathis, LLP

[57] ABSTRACT

A clock-supply control system has an AND circuit whereby, when a transfer halt signal and a processing completion signal output by a DSP as well as a transfer halt signal output by a data output unit are all activated, the supply of a clock signal to the DSP is cut off.

12 Claims, 10 Drawing Sheets

CLOCK-SUPPLY CONTROL SYSTEM OF DIGITAL-SIGNAL PROCESSORS

BACKGROUND OF THE INVENTION

1. Field of the Invention

The present invention relates to a clock-supply control system of digital-signal processors.

2. Description of the Prior Art

Figure 10:
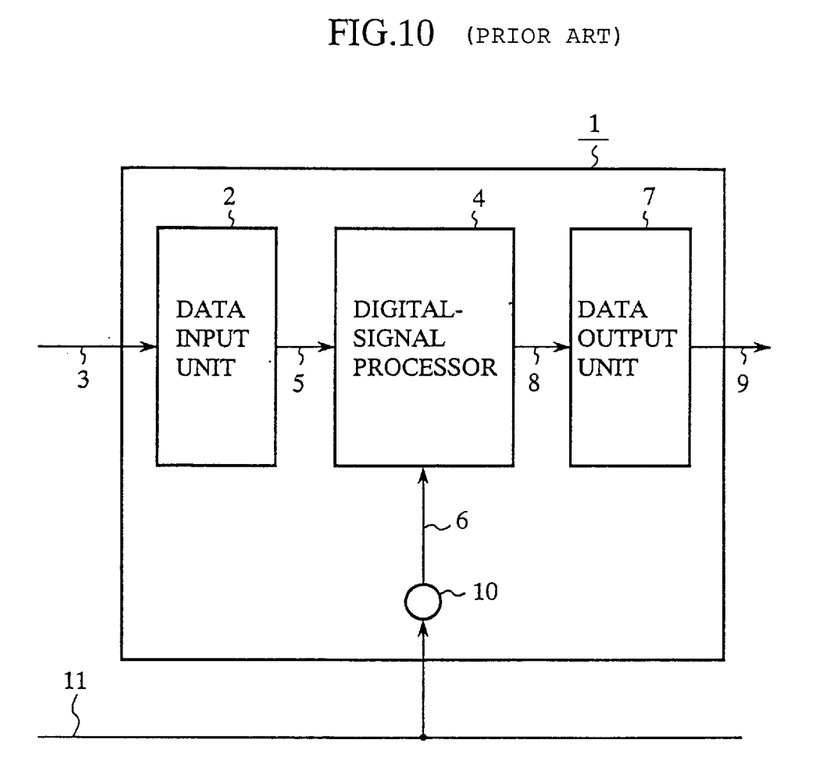
FIG. 10 is a block diagram showing the conventional digital-signal processing block.

FIG. 10 is a block diagram showing the configuration of a conventional digital-signal processing block. Reference numeral 1 shown in the figure is the digital-signal processing block and reference numeral 2 is a data input unit for inputting data 3. Reference numeral 4 is a digital-signal processor, referred to hereafter simply as a DSP, for inputting data 5 from the data input unit 2 and carrying out digital processing on the data 5 in synchronization with a clock signal 6. Reference numeral 7 is a data output unit for inputting data 8 from the DSP 4 and outputting data 9 to a circuit at the next stage. Reference numeral 10 is a frequency multiplier for multiplying the frequency of a system clock signal 11 in order to generate the clock signal 6 for driving the operation of the DSP 4.

Below is description of the operation of the digital-signal processing block.

A digital-signal processing technique using a DSP is known as a conventional method for carrying out digital-signal processing on audio or video data. Examples of such digital-signal processing are MPEG decoding and Dolby digital (AC3) decoding.

FIG. 10 is a diagram showing a digital-signal processing block having an embedded DSP 4 for carrying out such processing. Data 3 supplied to the data input unit 2 is transferred to the DSP 4 as data 5 with appropriate timing. The DSP 4 carries out digital processing on the data 5 in synchronization with the clock signal 6 in accordance with firmware embedded in the DSP 4. The DSP 4 then provides the data output unit 7 with data 8, which has completed the digital processing, with appropriate timing. The data output unit 7 then properly outputs the data 8 to a circuit at the next stage as data 9. It should be noted that the clock signal 6 for driving the operation of the DSP 4 is obtained by multiplying the frequency of the system clock 11 using the frequency multiplier 10.

The frequency of the clock signal 6 must be set at a value between a minimum frequency required for executing desired functions to carry out digital processing on the data 5 and a maximum frequency, above which the DSP 4 will most likely perform a malfunction.

In the case of a digital-signal processing block which is actually implemented by an LSI mounted on a board, the clock signal 6 supplied to the DSP 4 is normally generated from the system clock signal 11 of the board. In this way, oscillating elements can be eliminated and a non-synchronous frequency that can become a noise source can be avoided. It should be noted that the frequencies of the system clock signal used in an audio processing system are 256 fs and 384 fs where 1 fs is equal to 44.1 kHz.

In the case of a clock signal 6 generated from a board system clock 11 as described above, the clock signal 6 supplied to the DSP 4 may be obtained with a frequency which is higher than a minimum frequency required for the operation of the DSP 4 by an unnecessarily large difference. For example, assume that the minimum frequency required for the operation of the DSP 4 is 30 MHz and the system clock signal 11 has a frequency of 256 fs which is equal to 11.25 MHz. Let the frequency of the system clock signal be multiplied by 4 by means of the frequency multiplier 10 to generate a clock signal 6 to be supplied to the DSP 4 with a frequency of 4×11.25 MHz=45 MHz. In this case, the difference between the frequency of the clock signal 6 and the minimum frequency required for the operation of the DSP 4 is 45−30 =15 MHz. As a result, unnecessary operations may inadvertently take place even after the required digital processing has been completed early by the DSP 4 due to the clock signal 6 with an excessively high frequency.

The conventional digital-signal processing has a configuration described above wherein the clock signal 6 supplied to the DSP 4 is generated by merely multiplying the frequency of the system clock signal 11 using the frequency multiplier 10. Thus, the clock signal 6 may have a frequency which is higher than a minimum frequency required for the operation of the DSP 4 by an unnecessarily large difference. As a result, unnecessary operations may inadvertently take place even after the required digital processing has been completed early by the DSP 4 due to the clock signal 6 with an excessively high frequency, raising a problem that the amount of power consumed by the digital-signal processor increases unnecessarily.

It should be noted that the prior art is disclosed in, among other documents, JP-A No. 7-129272.

SUMMARY OF THE INVENTION

The present invention addresses the problem described above. It is thus an object of the present invention to provide a clock-supply control system of a digital-signal processor which is capable of reducing the frequency of a clock signal supplied to the digital-signal processor from a value higher than a minimum value by an excessively large difference to an optimum value which is capable of controlling the supply of a clock signal supplied to the digital-signal processor so as to decrease the amount of power consumed by the digital-signal processor.

In order to achieve the object described above, according to a first aspect of the present invention, there is provided a clock-supply control system of a digital-signal processor, the system comprising: the digital-signal processor which processes inputting data, carrying out digital processing on the data and outputting data in separate time zones; and a clock-signal cutoff unit which is used for cutting off the supply of a clock signal to the digital-signal processor when a second transfer request signal generated by the digital-signal processor and a second transfer halt signal generated by a data output unit are both activated.

According to a second aspect of the present invention, there is provided a clock-supply control system of a digital-signal processor, the system comprising: the digital-signal processor which processes inputting data, carrying out digital processing on the data and outputting data in separate time zones; and a clock-signal cutoff unit which is used for cutting off the supply of a clock signal to the digital-signal processor when a first transfer halt request and a second transfer request signal generated by the digital-signal processor as well as a second transfer halt signal generated by a data output unit are all activated.

According to a third aspect of the present invention, there is provided a clock-supply control system of a digital-signal processor, the system comprising: the digital-signal processor which processes inputting data, carrying out digital processing on the data and outputting data in separate time zones; and a clock-signal cutoff unit which is used for cutting off the supply of a clock signal to the digital-signal processor when a first transfer halt request and a processing completion signal generated by the digital-signal processor as well as a second transfer halt signal generated by a data output unit are all activated.

According to a fourth aspect of the present invention there is provided a clock-supply control system of a digital-signal processor, the system comprising: the digital-signal processor provided with a second buffer memory comprising an input buffer area, a processing buffer area and an output buffer area for allowing inputting data, digital processing on the data and outputting processed data to be processed at the same time; and a clock-signal cutoff unit which is used for cutting off the supply of a clock signal to the digital-signal processor when a first transfer halt request and a processing completion signal generated by the digital-signal processor as well as a second transfer halt signal generated by a data output unit are all activated.

According to a fifth aspect of the present invention, there is provided a clock-supply control system of digital-signal processors wherein the digital-signal processors are provided at a plurality of stages between a data input unit and a data output unit, and the supply of a clock signal to each digital-signal processor is cut off by clock-signal cutoff units provided at each of the plurality of stages of the digital-signal processors.

According to a sixth aspect of the present invention, there is provided a clock-supply control system of digital-signal processors wherein: digital-signal processing blocks each including a data input unit, a digital-signal processor, and the supply of a clock signal to each digital-signal processor is cut off by clock-signal cutoff units provided at each of the plurality of stages of the digital-signal processors.

BRIEF DESCRIPTION OF THE DRAWINGS

The object described above and other objects as well as many of the attendant advantages of the present invention will be readily appreciated as the same becomes more completely understood from a study of the following detailed description when considered in connection with the accompanying figures wherein.

DETAILED DESCRIPTION OF THE PREFERRED EMBODIMENTS

The present invention will become more apparent from a study of the following detailed description of some preferred embodiments with reference to the accompanying diagrams some of which show the embodiments.

First Embodiment

Figure 1:
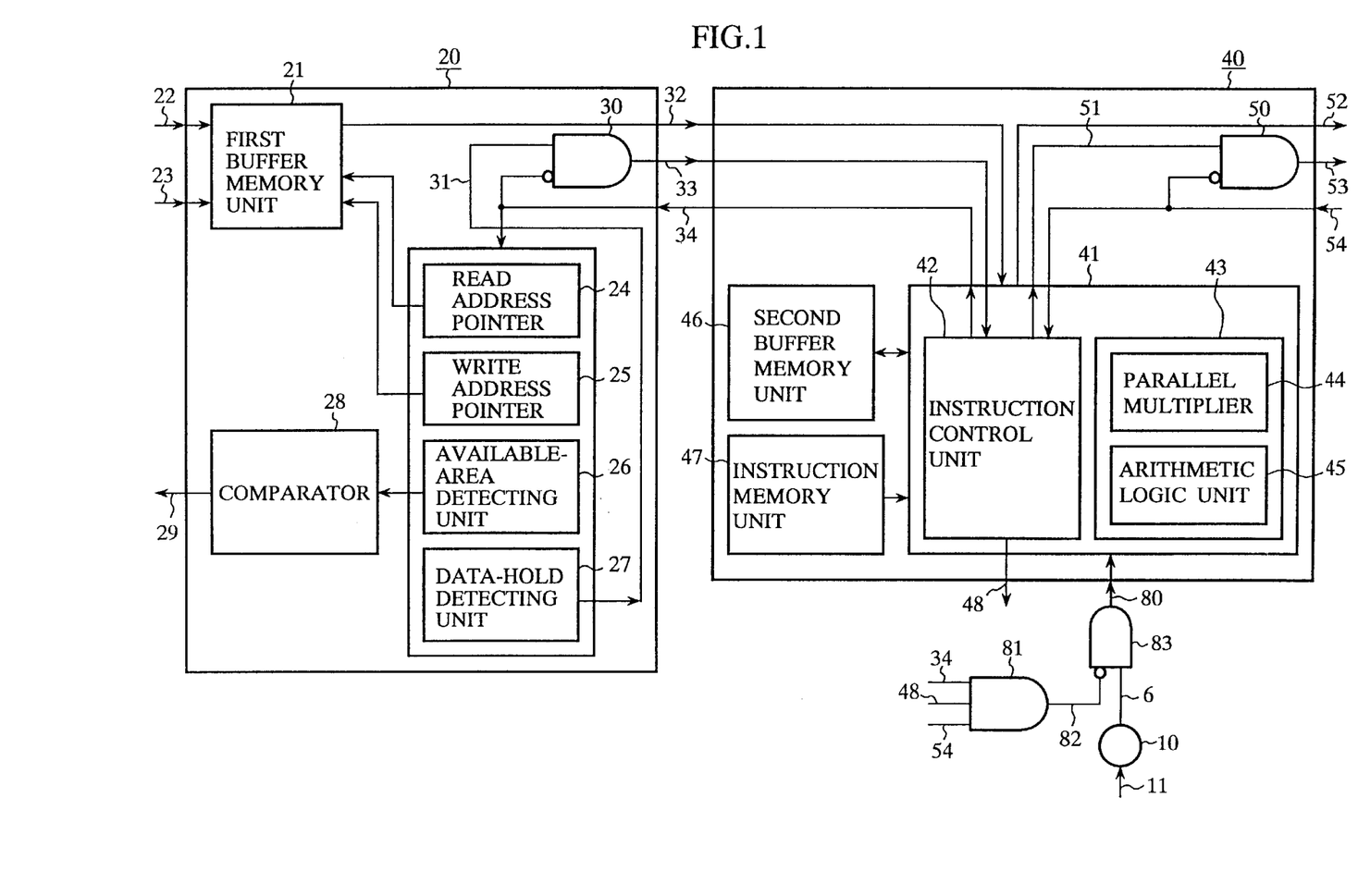
FIG. 1 and 2 are block diagrams showing a clock-supply control system of a digital-signal processor as implemented by a first embodiment of the present invention.
Figure 2:
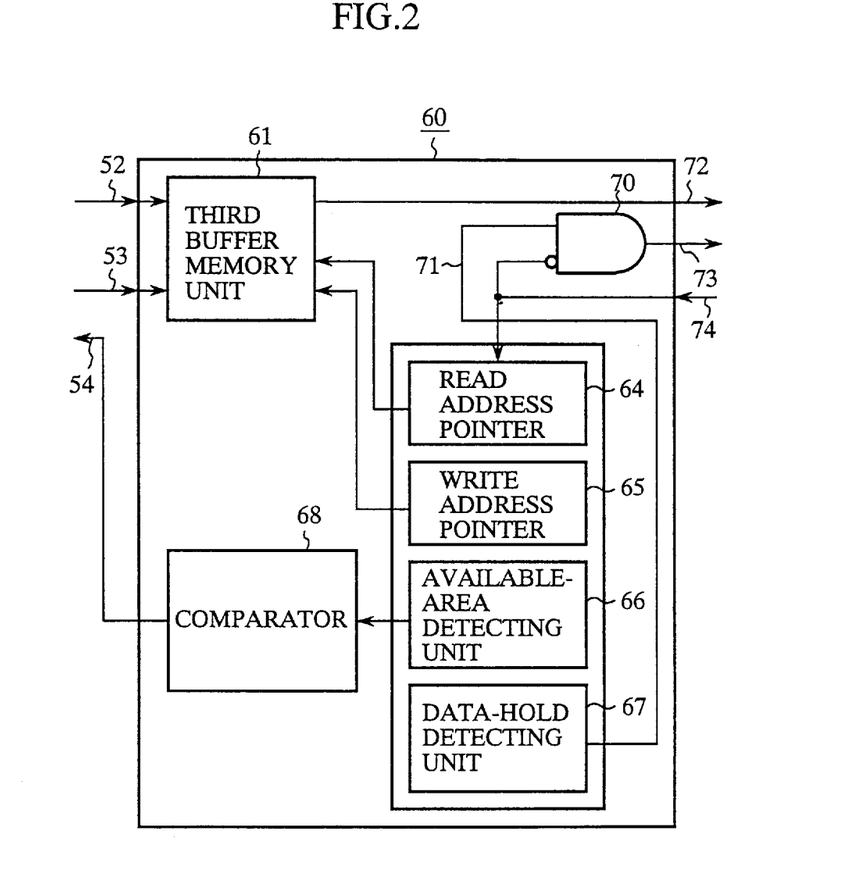

FIG. 1 and 2 are block diagrams showing a clock-supply control system of a digital-signal processor as implemented by a first embodiment of the present invention. As shown in the figure, the first embodiment comprises a data input unit 20, a digital-signal processor 40 and a data output unit 60. Reference numeral 21 is a first buffer memory unit employed in the data input unit 20 for holding incoming data 22. Reference numeral 23 is an incoming transfer request signal.

Reference numeral 24 is a read address pointer to a location in the first buffer memory unit 21 from which data is to be read out. On the other hand, reference numeral 25 is a write address pointer to a location in the first buffer memory unit 21 to which data is to be written. Reference numeral 26 is an available-area detecting unit for detecting an available area in the first buffer memory unit 21 from the values of the read and write address pointers 24 and 25. Reference numeral 27 is a data-hold detecting unit which is used for generating a first internal transfer request signal 31 when it has been detected from the values of the read and write address pointers 24 and 25 that incoming data 22 has been put and held in the first buffer memory unit 21. Reference numeral 28 is a comparator which is used for generating an outgoing transfer halt signal 29 when the size of the available area in the first buffer memory unit 21 detected by the available-area detecting unit 26 is smaller than a predetermined value. Reference numeral 30 is an AND circuit for outputting a first transfer request signal 33 representing the logical product of the first internal transfer request signal 31 and the inverted value of a first transfer halt signal 34 supplied by the digital-signal processor 40.

As for the digital-signal processor 40 which is also referred to hereafter simply as a DSP, reference numeral 41 is a DSP core employed therein for carrying out digital processing on buffered data 32 in synchronization with a clock signal 80. Reference numerals 42 and 43 are an instruction control unit and a processing unit employed in the DSP core 41 respectively. The processing unit 43 comprises a parallel multiplier 44 and an arithmetic logic unit 45. Reference numeral 46 is a second buffer memory unit for holding the buffered data 32 and data completing the digital processing carried out on the buffered data 32. Reference numeral 47 is an instruction memory unit for storing instruction codes for controlling the DSP core 41. Reference numeral 48 is a processing completion signal which is output by the instruction control unit 42 when the instruction control unit 42 forms a judgment that digital processing has been completed. Reference numeral 51 is a second internal transfer request signal which is output by the instruction control unit 42 when it is desired to transfer data 52 completing digital processing. Reference numeral 50 is an AND circuit for outputting a second transfer request signal 53 representing the logical product of the second internal transfer request signal 51 and the inverted value of a second transfer halt signal 54 supplied by the data output unit 60.

As for the data output unit 60, reference numeral 61 is a third buffer memory unit employed therein for inputting and holding the data 52 completing digital processing from the instruction control unit 42 in accordance with the second transfer request 53. Reference numeral 64 is a read address pointer to a location in the third buffer memory unit 61 from which data is to be read out. On the other hand, reference numeral 65 is a write address pointer to a location in the first buffer memory unit 61 to which data is to be written. Reference numeral 66 is an available-area detecting unit for detecting an available area in the third buffer memory unit 61 from the values of the read and write address pointers 64 and 65. Reference numeral 67 is a data-hold detecting unit which is used for generating a third internal transfer request signal 71 when the fact that processed data 52 has been put and held in the third buffer memory unit 61 has been detected from the values of the read and write address pointers 64 and 65. Reference numeral 68 is a comparator which is used for generating the second transfer halt signal 54 cited above when the size of the available area in the first buffer memory unit 61 detected by the available-area detecting unit 66 is smaller than a predetermined value. Reference numeral 70 is an AND circuit for outputting an outgoing transfer request signal 73 representing the logical product of the third internal transfer request signal 71 and the inverted value of an incoming transfer halt signal 74. Reference numeral 72 is outgoing data.

Reference numeral 10 is a frequency multiplier for multiplying the frequency 256 fs (=11.25 MHz) of a system clock signal 11 by four to generate a clock signal 6 with a frequency of 45 MHz (=4×11.25 MHz).

Reference numeral 81 is an AND circuit for generating a clock stop signal 82 representing the logical product of the first transfer halt signal 34, the second transfer halt signal 54 and the processing completion signal 48. Reference numeral 83 is an AND circuit for generating a multiplied-frequency clock signal 80 representing the logical product of the clock signal 6 and the inverted value of the clock stop signal 82. The AND circuit 83 serves as a clock-signal cutoff unit. In addition, assume that the minimum frequency required for the operation of the DSP 40 is 30 MHz like the conventional DSP 4.

The operation of the clock-supply control system is explained as follows.

The DSP 40 employed in the first embodiment is an apparatus for inputting the buffered data 32, processing the buffered data 32, producing processed data 52 and outputting the processed data 52 in data-segment units using a sequential-processing technique.

Figure 3:
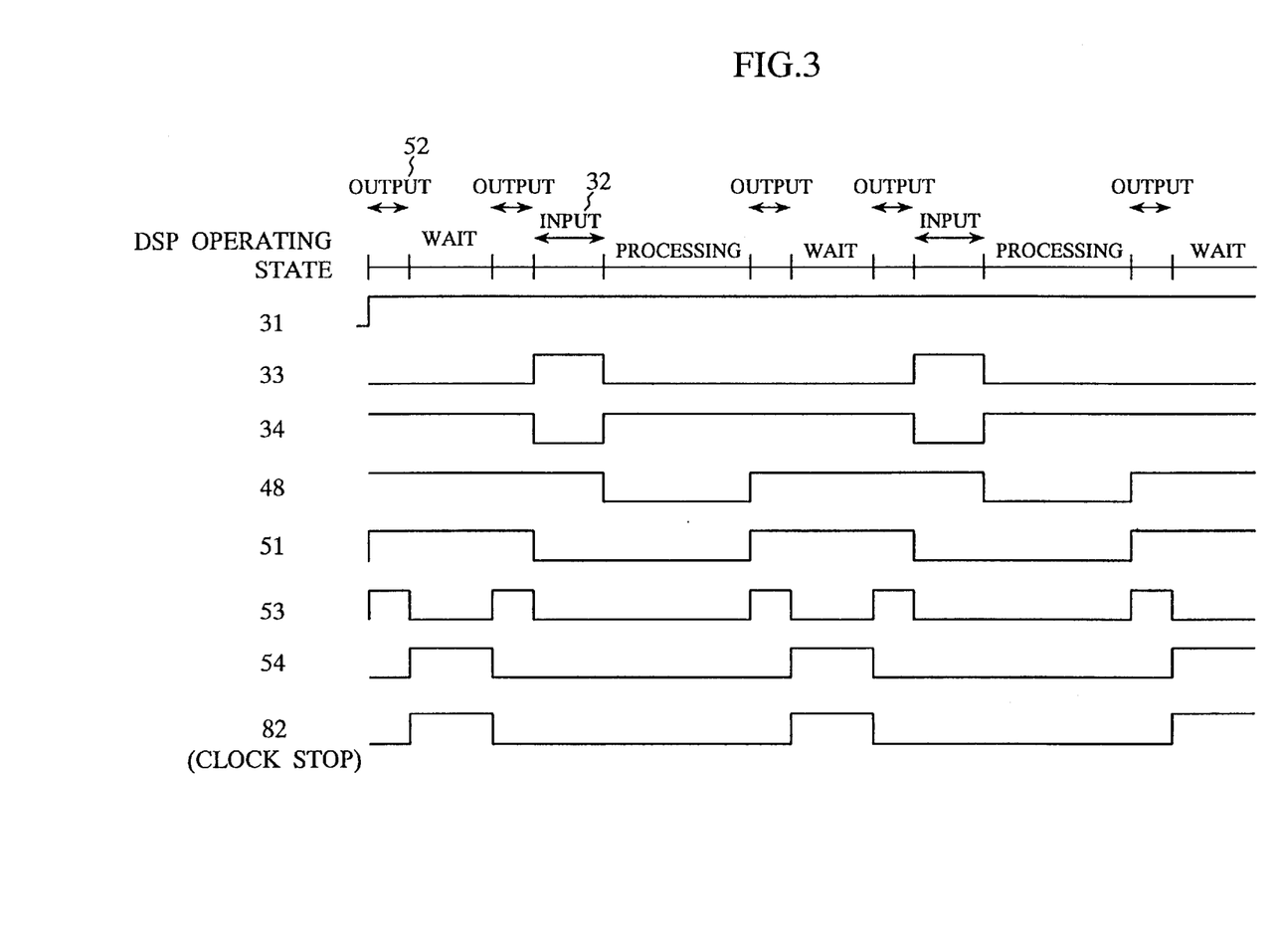
FIG. 3 is timing charts of operations carried out by the digital-signal processor implemented by the first embodiment of the present invention.

FIG. 3 is timing charts of operations carried out by the digital-signal processor implemented by the first embodiment of the present invention. The operation of the clock-supply control system is explained by referring to FIGS. 1 and 2.

When input data 22 is stored in the first buffer memory unit 21 employed in the data input unit 20, the data-hold detecting unit 27 detects the fact that the input data 22 is held in the first buffer memory unit 21 from the values of the read and write address pointers 24 and 25, setting the first internal transfer request signal 31 at the H level. The first internal transfer request signal 31 is passed on by the AND circuit 30 as the first transfer request signal 33 set at the H level to the DSP 40 if the first transfer halt signal 34 supplied by the DSP 40 is reset at the L level. Receiving the first transfer request signal 33 set at the H level, the instruction control unit 42 employed in the DSP 40 inputs buffered data 32 from the first buffer memory unit 21.

It should be noted that, if the first transfer halt signal 34 is set at the H level, however, the buffered data 32 can not be transferred to the DSP 40 even if the first internal transfer request signal 31 is set at the H level. In this case, the data input unit 20 halts operations involving the transfer of data 32 such as updating the read address pointer 24 in accordance with the first transfer halt signal 34.

Receiving the first transfer request signal 33 set at the H level, the instruction control unit 42 employed in the DSP 40 inputs a predetermined amount of buffered data 32 from the first buffer memory unit 21 in accordance with instruction codes stored in the instruction memory unit 47 and stores the data 32 in the second buffer memory unit 46. The instruction control unit 42 resets the first transfer halt unit 34 at the L level only when buffered data 32 is being input from the first buffer memory unit 21. At other times, the instruction control unit 42 sets the first transfer halt unit 34 supplied to the data input unit 30 at the H level. Thereafter, the instruction control unit 42 carries out digital processing on the data 32 of the predetermined amount stored in the second buffer memory unit 46 by means of the parallel multiplier 44 and the arithmetic logic unit 45 employed in the processing unit 43 in synchronization with the clock signal 80 in accordance with instruction codes stored in memory unit 47. While the digital processing is being carried out, the processing completion signal 48 is reset at the L level. After the digital processing has been completed, however, the processing completion signal 48 is set at the H level. The instruction control unit 42 also sets the second internal transfer request signal 51 at the H level as well after the digital processing has been completed. The second internal transfer request signal 51 is passed on by the AND circuit 50 as the second transfer request signal 53 set at the H level to the data output unit 60 if the second transfer halt signal 54 supplied by the data output unit 60 is reset at the L level. Receiving the second transfer request signal 53 set at the H l level, the third buffer memory unit 61 employed in the data output unit 60 inputs processed data 52 from the instruction control unit 42.

It should be noted that, if the second transfer halt signal 54 is set at the H level, the processed data 52 can not be transferred from the instruction control unit 42 to the data output unit 60 even if the second internal transfer request signal 51 is set at the H level. In this case, the instruction control unit 42 halts operations involving the transfer of the processed data 52 in accordance with the first transfer halt signal 34.

Even if processed data 52 is stored in the third buffer memory buffer unit 61, there may be still an available area left in the third buffer memory unit 61. The available-area detecting unit 66 detects the available area in the third buffer memory unit 61 from the values of the read and write address pointers 64 and 65. The comparator 68 sets the second transfer halt signal 54 at the H level and outputs the second transfer halt signal 54 to the DSP 40 when the size of the available area left in the first buffer memory unit 61 detected by the available-area detecting unit 66 is found smaller than a predetermined value. Receiving the second transfer halt signal 54 set at the H level, the instruction control unit 42 halts the operation to transfer the processed data 52 to the third buffer memory unit 61. When processed data 52 is stored in the third buffer memory unit 61 employed in the data output unit 60, the data-hold detecting unit 67 detects the fact that the processed data 52 is held in the third buffer memory unit 61 from the values of the read and write address pointers 64 and 65, setting the third internal transfer request signal 71 at the H level. The third internal transfer request signal 31 is passed on by the AND circuit 70 as the outgoing transfer request signal 73 set at the H level to the a circuit at the next stage if the incoming transfer halt signal 74 is reset at the L level. Receiving the outgoing transfer request signal 73 set at the H level, the circuit at the next stage inputs output data 72 from the third buffer memory unit 61.

In the conventional digital-signal processing block, typically, the minimum frequency required for the operation of the DSP 4 is 30 MHz and the system clock signal 11 has a frequency of 256 fs which is equal to 11.25 MHz. The frequency of the system clock signal is multiplied by 4 by means of the frequency multiplier 10 to generate a clock signal 6 to be supplied to the DSP 4 with a frequency of 4×11.25 MHz=45 MHz. The difference between the frequency of the clock signal 6 and the minimum frequency required for the operation of the DSP 4 is 45−30=15 MHz. As a result, unnecessary operations may inadvertently take place even after the required digital processing has been completed earlier by the DSP 4 due to the clock signal 6 with an excessively high frequency.

In the case of the first embodiment, however, the AND circuit 81 generates a clock stop signal 82 representing the logical product of the first transfer halt signal 34 generated by the DSP 40, the second transfer halt signal 54 generated by the data output unit 60 and the processing completion signal 48 also generated by the DSP 40. The AND circuit 83 in turn generates a multiplied-frequency clock signal 80 representing the logical product of the clock signal 6 and the inverted value of the clock stop signal 82.

Specifically, the logic value 'true'of the logical product of the first transfer halt signal 34, the second transfer halt signal 54 and the processing completion signal 48 indicates that the DSP core 41 of the DSP 40 has completed digital processing and would naturally like to output processed data 52 to the data output unit 60 but the third buffer memory unit 61 is full, leaving no available space so that the processed data 52 is put in a wait state in the second buffer memory unit 46. In addition, the fact that the instruction control unit 42 employed in the DSP 4 outputs the first transfer halt signal 34 set at the H level prevents new buffered data 32 from being supplied from the data input unit 20 so that the DSP core 41 of the DSP 40 will not operate. At that time, if the clock signal 80 were supplied to the DSP 40, an unnecessary operation would take place, unnecessarily increasing the amount of consumed power. Since the DSP 40 is in a state in which it is actually not necessary to do anything, however, the operation of the DSP 40 is halted by cutting off the supply of the clock signal 80 to the DSP 40. In this state, the amount of consumed power can be reduced.

It should be noted that the clock stop signal 82 is deactivated when the second transfer halt signal 54 generated by the data output unit 60 is set to the L level. That is to say, the clock stop signal 82 is deactivated when outgoing data 72 held in the third buffer memory unit 61 is transferred to a circuit at the next stage, leaving an available area greater than the predetermined value in the third buffer memory unit 61.

It is also worth noting that, while the clock-supply control system provided by the present invention has been described with reference to the first illustrative embodiment, the description is not intended to be construed in a limiting sense. That is to say, it is to be understood that the subject matter encompassed by the present invention is not limited to the first embodiment. For example, in the first embodiment, the clock stop signal 82 is activated when the logic value of the logical product of the first transfer halt signal 34, the second transfer halt signal 54 and the processing completion signal 48 is 'true' also as described above. It should be noted, however, that the clock stop signal 82 can also be generated as the logical product of the second internal transfer request signal 51 and the second transfer halt signal 54 as is obvious from FIG. 3.

Specifically, the activation of the second internal transfer request signal 51 allows the completion of the digital processing to be detected. If the second transfer halt signal 54 is also activated while the second internal transfer request signal 51 is active, the instruction control unit 42 would naturally like to transfer processed data 52 to the data output unit 60 but the processed data 52 can not be transferred, being put in a wait state in the second buffer memory unit 46. As described above, in the first embodiment, the DSP 40 is an apparatus for inputting the buffered data 32, processing the buffered data 32, producing processed data 52 and outputting the processed data 52 in data-segment units using a sequential-processing technique. Therefore, if the processed data 52 can not be output, the buffered data 32 can not be input as well. In addition, since the digital processing has been completed, the DSP core 41 of the DSP 40 is in a state in which it is actually not necessary to do anything. As a result, the operation of the DSP 40 can be halted by cutting off the supply of the clock signal 80 to the DSP 40. In this state, the amount of consumed power can thus be reduced.

Even with the modified version of the first embodiment described above, it is also possible to provide the same effect as the first embodiment and, at the same time, since the number of conditions is reduced, the number of causes of incorrect detection can also be decreased as well.

As described above, in the first embodiment, the DSP 40 is an apparatus for inputting the buffered data 32, processing the buffered data 32, producing processed data 52 and outputting the processed data 52 in data-segment units using a sequential-processing technique. If the DSP 40 is utilized as an apparatus for inputting/outputting buffered data 32 and processing the buffered data 32 in data-segment units using a sequential-processing technique, however, the clock stop signal 82 can also be activated when the logic value of the logical product of the first transfer halt signal 34, the second transfer halt signal 54 and the second internal transfer request signal 51 becomes 'true'.

Specifically, the activation of the second internal transfer request signal 51 allows the completion of the digital processing to be detected. If the second transfer halt signal 54 is also activated while the second internal transfer request signal 51 is active, the instruction control unit 42 would naturally like to transfer processed data 52 to the data output unit 60 but the processed data can not be transferred, being put in a wait state in the second buffer memory unit 46. In addition, the fact that the instruction control unit 42 employed in the DSP 4 outputs the first transfer halt signal 34 set at the H level prevents new buffered data 32 from being supplied from the data input unit 20 so that the DSP core 41 of the DSP 40 will not operate, causing the DSP core 41 of the DSP 40 to enter a state in which it is actually not necessary to do anything. In this state, the operation of the DSP 40 is halted by cutting off the supply of the clock signal 80 to the DSP 40, allowing the amount of power consumed thereby at that time to be reduced.

Also in this case, it is possible to obtain the same effect as that exhibited by the first embodiment.

As described above, in the first embodiment, the clock stop signal 82 is activated when the logic value of the logical product of the first transfer halt signal 34, the second transfer halt signal 54 and the processing completion signal 48 is 'true'. It should be noted, however, that the clock stop signal 82 can also be activated merely when the digital processing carried out by the DSP 40 is completed and the DSP 40 enters a state in which it is not necessary to do anything. That is to say, techniques for generating the clock stop signal 82 is not limited to that adopted by the first embodiment.

As described above, in the first embodiment, the instruction control unit 42 inputs a predetermined amount of buffered data 32 from the first buffer memory unit 21, storing it in the second buffer memory unit 46. It should be noted, however, that the instruction control unit 42 can also input a predetermined amount of buffered data 32 from the first buffer memory unit 21, storing it in the second buffer memory unit 46 after carrying out digital processing on the buffered data 32 by means of the processing unit 43. As an alternative, the instruction control unit 42 can also input a predetermined amount of buffered data 32 from the first buffer memory unit 21, directly storing processed data 52 in the third buffer memory unit 61 after carrying out digital processing on the buffered data 32 by means of the processing unit 43.

As described above, in the first embodiment, the instruction control unit 42 carries out digital processing on a predetermined amount of buffered data 32 stored in the second buffer memory unit 46, directly outputting processed data 52 to the data output unit 60. It should be noted, however, that the processed data 52 can also be once stored in the second buffer memory unit 46 before being transferred to the data output unit 60.

As described above, the first embodiment has a configuration wherein the DSP 40 is an apparatus for inputting the buffered data 32, processing the buffered data 32, producing processed data 52 and outputting the processed data 52 in data-segment units using a sequential-processing technique, and the clock stop signal 82 is activated when the logic value of the logical product of the first transfer halt signal 34, the second transfer halt signal 54 and the processing completion signal 48 is 'true'. As a result, when the clock stop signal 82 is activated, the supply of the clock signal 80 to the DSP 40 is cut off to halt the operation of the DSP 40, allowing the amount of power consumed thereby at that time to be reduced.

Also as described above, the supply of the clock signal 80 can also be cut off when the logic value of the logical product of the second internal transfer request signal 51 and the second transfer halt signal 54 becomes 'true' to yet exhibit the same effect.

In addition, if the DSP 40 is utilized as an apparatus for inputting/outputting buffered data 32 and processing the buffered data 32 in data-segment units using a sequential-processing technique, however, the supply of the clock signal 80 to the DSP 40 can also be halted when the logic l value of the logical product of the first transfer halt signal 34, the second transfer halt signal 54 and the second internal transfer request signal 51 becomes 'true' to yet exhibit the same effect.

Second Embodiment

Figure 4:
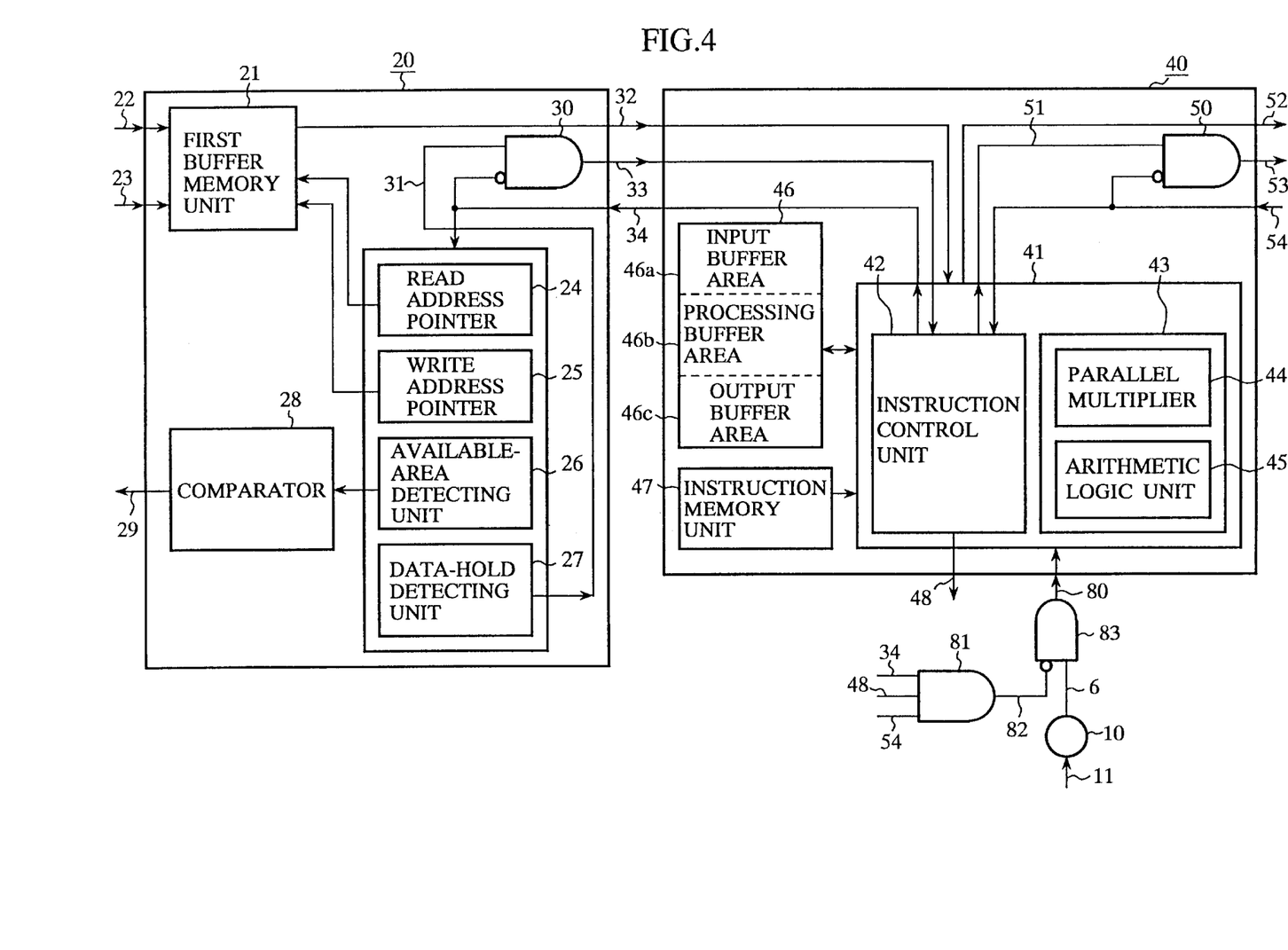
FIG. 4 and 5 are block diagrams showing a clock-supply control system of a digital-signal processor as implemented by a second embodiment of the present invention.
Figure 5:
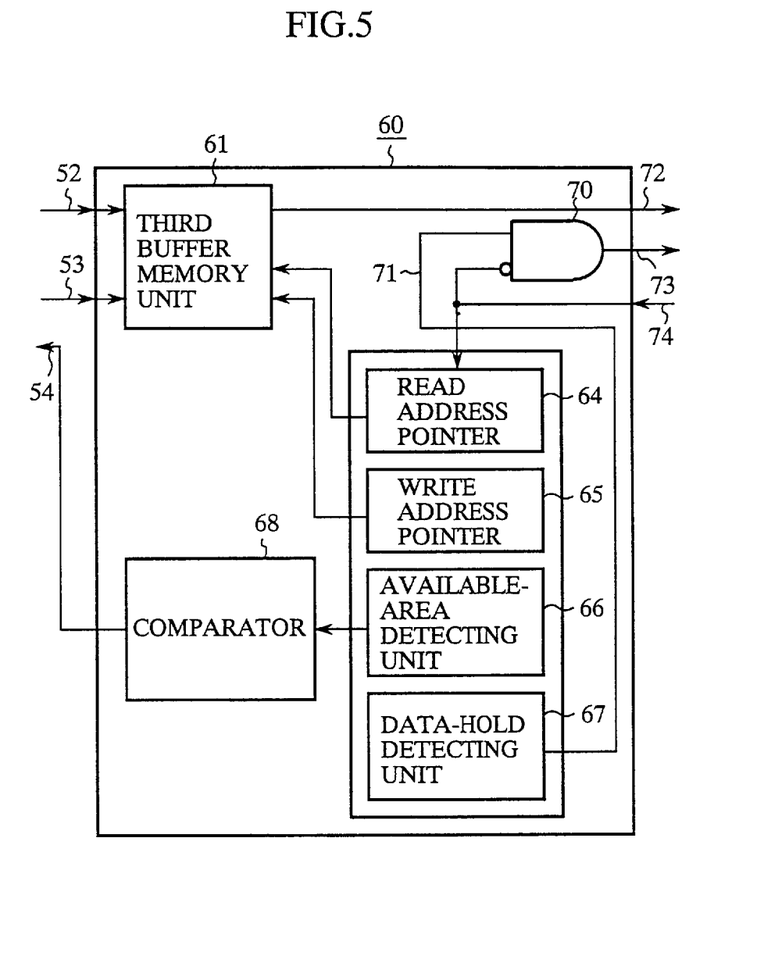

FIG. 4 and 5 are block diagrams showing a clock-supply control system of a digital-signal processor as implemented by a second embodiment of the present invention. Like the first embodiment, reference numeral 46 shown in the figure is a second buffer memory unit. In the case of the second embodiment, however, the second buffer memory unit 46 is divided into an input buffer area 46a, a processing buffer area 46b and an output buffer area 46c.

It should be noted since that the other configuration elements are the same as those of the first embodiment, the description thereof is omitted in order to avoid duplication of explanation.

The operation of the second embodiment is described as follows.

In the case of the second embodiment, the DSP 40 is an apparatus that is capable of carrying out operations to input and process buffered data 32 as well as operations to output processed data 52 concurrently.

Figure 6:
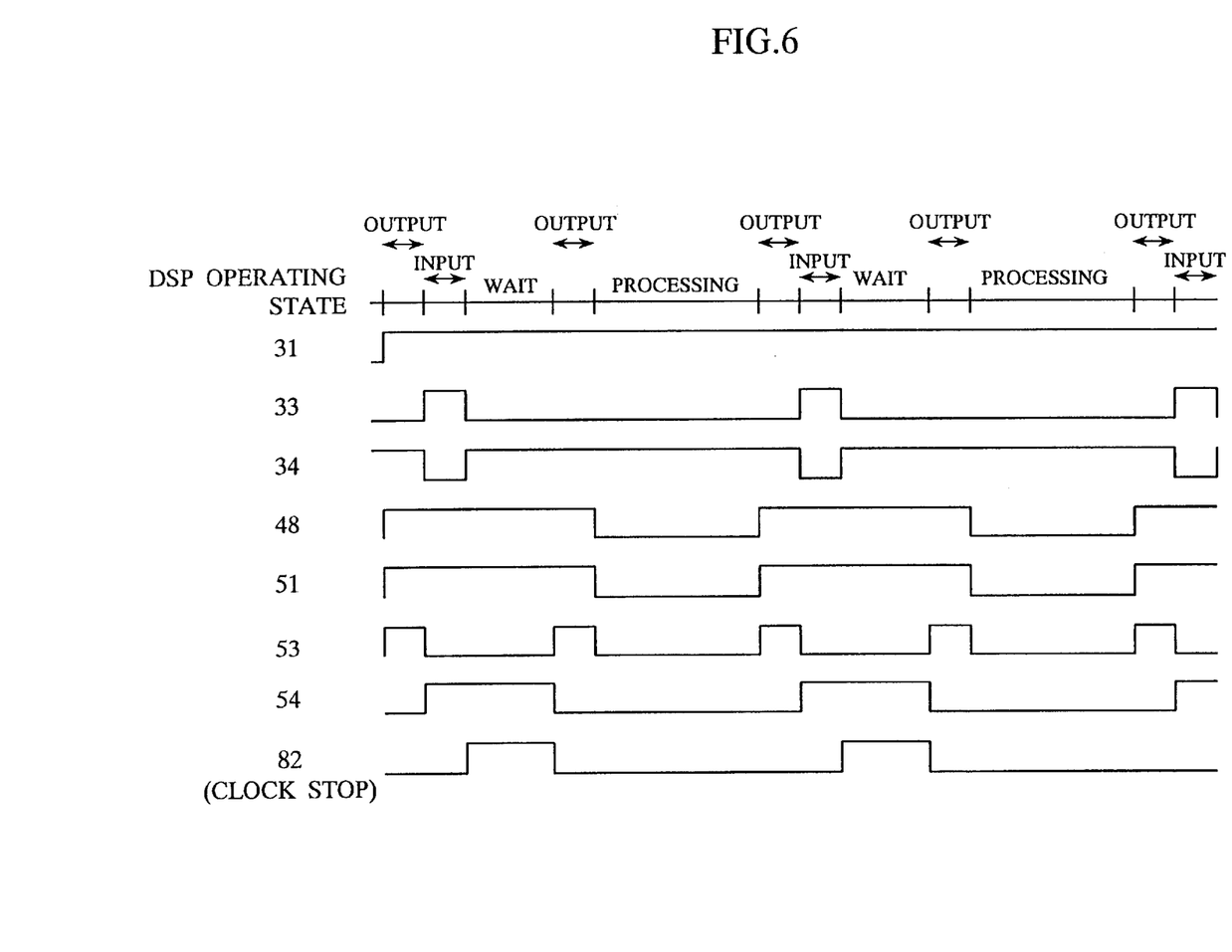
FIG. 6 is timing charts of operations carried out by the clock-supply control system of the digital-signal processor implemented by the second embodiment of the present invention.

FIG. 6 is timing charts of operations carried out by the clock-speed control system of the digital-signal processor implemented by the second embodiment of the present invention. The operation of the second embodiment is explained by referring to FIGS. 3 and 4.

Since the operations of the data input unit 20 and the data output unit 60 are the same as those of the first embodiment, the explanation thereof is omitted, leaving only description of the DSP 40.

Like the first embodiment, when the first transfer request signal 33 is set at the H level, the instruction control unit 42 employed in the DSP 40 inputs a predetermined amount of buffered data 32 from the first buffer memory unit 21 in accordance with instruction codes stored in the instruction memory unit 47 and stores the data 32 in the second buffer memory unit 46. Thereafter, the instruction control unit 42 carries out digital processing on the buffered data 32 of the predetermined amount stored in the second buffer memory unit 46, producing processed data 52.

It should be noted that, also like the modifications of the first embodiment described above, the instruction control unit 42 can also input a predetermined amount of buffered data 32 from the first buffer memory unit 21, storing it in the second buffer memory unit 46 after carrying out digital processing on the buffered data 32 by means of the processing unit 43. As an alternative, the instruction control unit 42 can also input a predetermined amount of buffered data 32 from the first buffer memory unit 21, directly storing processed data 52 in the third buffer memory unit 61 after carrying out digital processing on the buffered data 32 by means of the processing unit 43. As another alternative, the l instruction control unit 42 carries out digital processing on the buffered data 32 stored in the second buffer memory unit 46 by means of the processing unit 43 to produce processed data 52 which is once stored in the second buffer memory unit 46 before being transferred to the third buffer memory unit 61.

As described above, in the case of the second embodiment, the second buffer memory unit 46 is divided into an input buffer area 46a, a processing buffer area 46b and an output buffer area 46c. Instruction codes must be provided so that instructions represented thereby can keep up with concurrent execution of two or more pieces of processing to input and process buffered data 32 and to output processed data 52.

Also like the first embodiment, the clock stop signal 82 is generated by the AND circuit 81 as the logical product of the first transfer halt signal 34 output by the DSP 40, the second transfer halt signal 54 produced by the data output unit 60 and the processing completion signal 48 also output by the DSP 40. The clock stop signal 82 is supplied to the AND circuit 83. The supply of the clock signal 80 to the DSP 40 is halted by blocking the clock signal 6 by means of the AND circuit 83, putting the DSP 40 in a halt state while the clock stop signal 82 is active.

As described above, in the case of the first embodiment, the clock stop signal 82 can also be generated as the logical product of the second internal transfer request signal 51 and the second transfer halt signal 54 as is obvious from FIG. 3. In the case of the second embodiment, however, the DSP 40 is an apparatus that is capable of carrying out operations to input and process buffered data 32 as well as operations to output processed data 52 concurrently. Therefore, the DSP 40 is capable of carrying out operations while buffered data 32 is being transferred from the data input unit 20 to the DSP 40. Thus, the activation of the first transfer halt signal 34 is a required 'necessary' condition for activating the clock stop signal 82 as is obvious from FIG. 6.

As described above, in the case of the second embodiment, however, the DSP 40 is an apparatus that is capable of carrying out operations to input and process buffered data 32 as well as operations to output processed data 52 concurrently. Therefore, the supply of the clock signal 80 can be halted when the logic value of the logical product of the first transfer halt signal 34 output by the DSP 40, the second transfer halt signal 54 produced by the data output unit 60 and the processing completion signal 48 is 'true'. As a result, by cutting off the supply of the clock signal 80 to the DSP 40 to halt the operation of the DSP 40, the amount of power consumed thereby at that time can be reduced.

Third Embodiment

Figure 7:
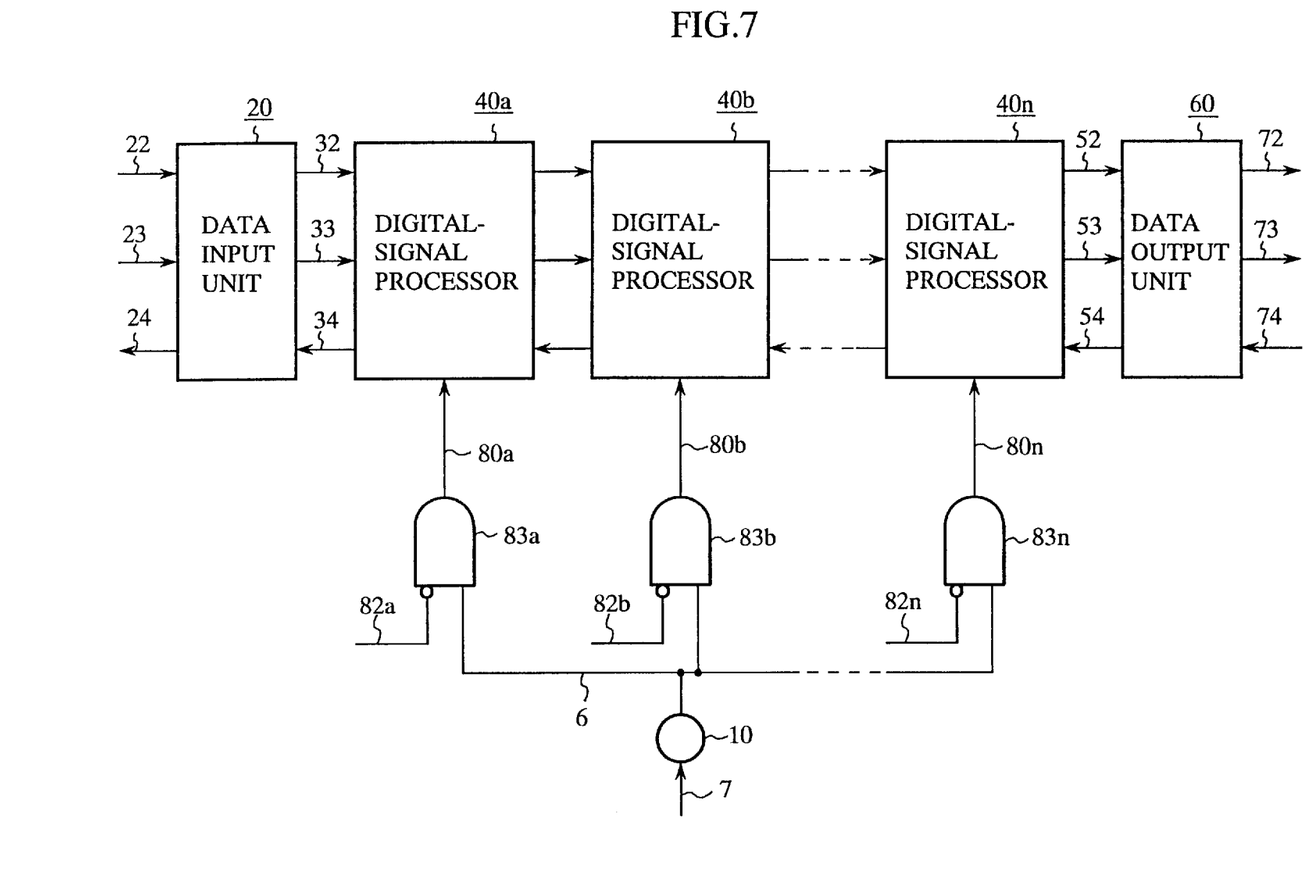
FIG. 7 is a block diagram showing a clock-supply control system of digital-signal processors as implemented by a third embodiment of the present invention.

FIG. 7 is a block diagram showing a clock-supply control system of digital-signal processors as implemented by third embodiment of the present invention. Reference numerals 40*a* to 40*n* shown in the figure are DSPs (Digital-Signal Processors) provided at a plurality of stages 1 between the data input unit 20 and the data output unit 60. Reference numerals 83*a* to 83*n* are AND circuits provided for the DSPs 40*a* to 40*n* at the stages respectively. Like the first embodiment, the AND circuits 83*a* to 83*n* each serve as a clock-signal cutoff unit.

It should be noted that since the other configuration elements are the same as those of the first or second embodiment, the description thereof is omitted in order to avoid duplication of explanation.

The operation of the third embodiment is described as follows.

The third embodiment implements an apparatus wherein DSPs provided at a plurality of stages are each used for carrying out a piece of digital processing.

Buffered data 32 stored in the data input unit 20 sequentially undergoes digital processing by the DSPs 40*a* to 40*n* and is then output as outgoing data 72 from the data output unit 60. The DSPs 40*a* to 40*n* are provided with AND circuits 83*a* to 83*n* for halting the supplies of the clock signals 80*a* to 80*n* to the DSP 40*a* to 40*n* at the activation of the clock stop signals 82*a* to 82*n* respectively.

As described above, the third embodiment implements a clock-signal control system employing DSPs provided at a plurality of stages each for carrying out a piece of digital processing wherein the supplies of the clock signals 80*a* to 80*n* to the DSP 40*a* to 40*n* are halted at the activation of the clock stop signals 82*a* to 82*n* respectively. As a result, by cutting off the supplies of the clock signals 80*a* to 80*n* to the DSPs 40*a* to 40*n* to halt the operations of the DSP 40*a* to 40*n*, the amount of power consumed thereby at that time can be reduced.

Fourth Embodiment

Figure 8:
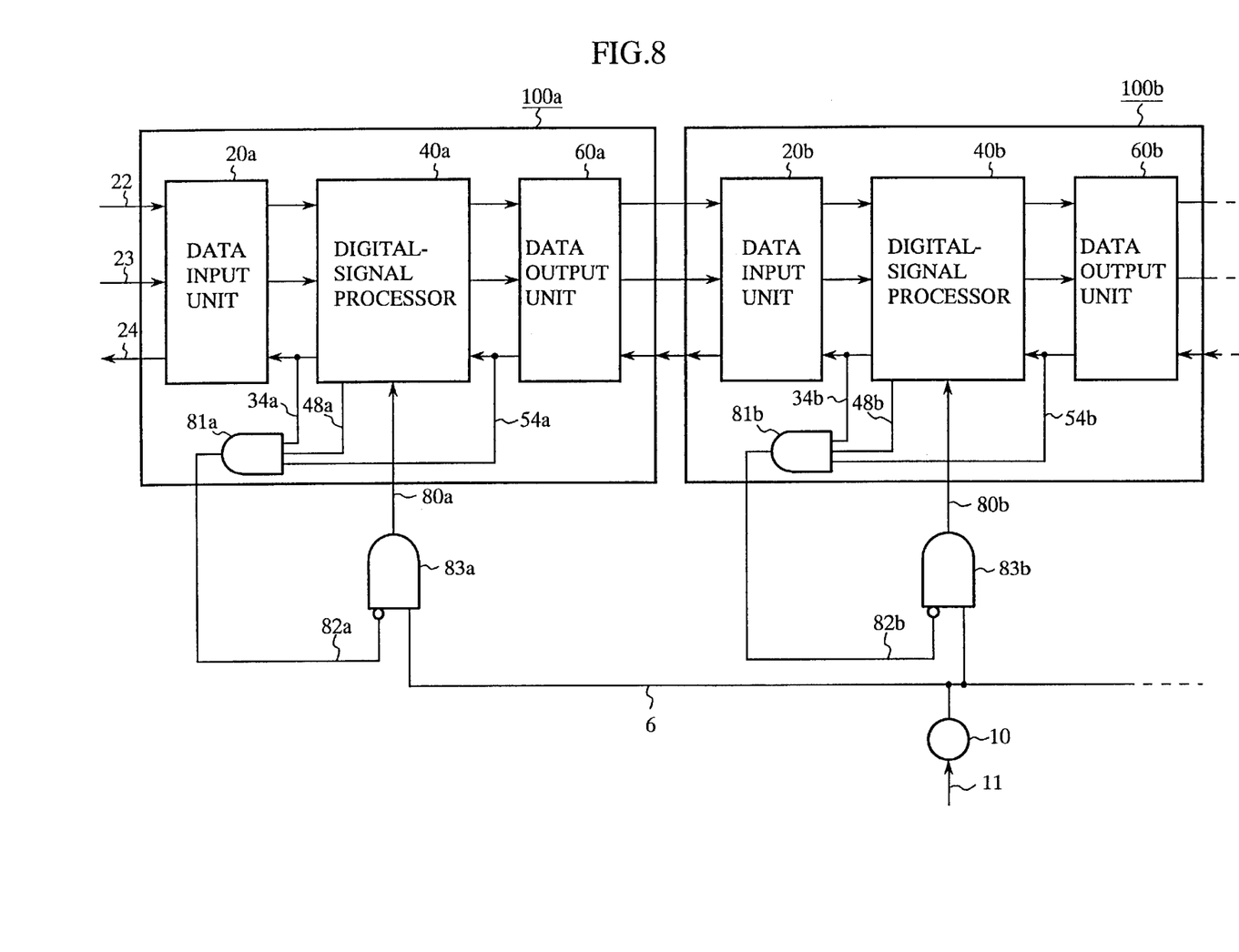
FIG. 8 and 9 are block diagrams showing a clock-supply control system of digital-signal processors as implemented by a fourth embodiment of the present invention.
Figure 9:
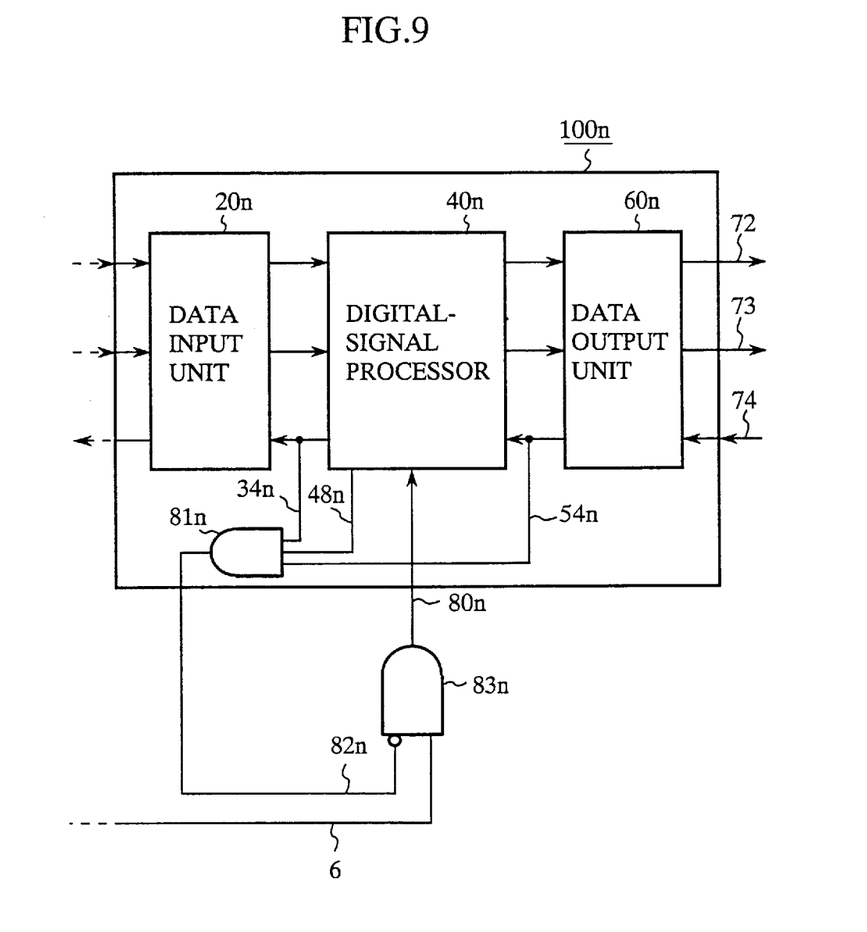

FIG. 8 and 9 are block diagrams showing a clock-supply control system of digital-signal processors as implemented by a fourth embodiment of the present invention. Reference numerals 100*a* to 100*n* shown in the figure are digital-signal processing blocks provided at a plurality of stages which are each referred to hereafter simply as a DSP block. As shown in the figure, each of the DSP blocks 100*a* to 100*n* comprises a data input unit, a DSP and a data output unit. Reference numerals 34*a* to 34*n* and 54*a* to 54*n* are transfer halt signals whereas reference numerals 48*a* to 48*n* are processing completion signals generated in the DSP blocks 100*a* to 100*n* respectively. Reference numerals 81*a* to 81*n* are AND gates employed in the DSP blocks 100*a* to 100*n* respectively.

It should be noted that since the other configuration elements are the same as those of the first to third embodiments, the description thereof is omitted in order to avoid duplication of explanation.

The operation of the fourth embodiment is described as follows.

As described above, the fourth embodiment implements a clock-signal control system employing DSP blocks 100*a* to 100*n* provided at a plurality of stages each comprising a data input unit, a DSP and a data output unit.

Data 32 stored in the data input unit 20*a* employed in the DSP block 100*a* undergoes digital processing carried out by the DSP 40*a*, the same DSP as that employed in the first or second embodiment, and is then output from the data output unit 60*a*. The data output from the data output unit 60*a* is transferred to the data input unit 20*b* employed in the DSP block 100*b* provided at the next stage. In this way, data undergoes digital processing in the DSP blocks 10*a* to 100*n* sequentially and is then output as outgoing data 72 from the data output unit 60*n*. The DSP blocks 100*a* to 100*n* are provided with the AND circuits 81*a* to 81*n* for generating clock stop signals 82*a* to 82*n* representing logical products of the first transfer halt signals 34*a* to 34*n*, the second transfer halt signals 54*a* to 54*n* and the processing completion signals 48*a* to 48*n* respectively. The clock stop signals 82*a* to 82*n* are activated to cut off the supplies of the clock signals 80*a* to 80*n* to the DSPs 40*a* to 40*n* respectively.

As described above, in the case of the fourth embodiment, the clock stop signals 82*a* to 82*n* are generated as logical products of the first transfer halt signals 34*a* to 34*n*, the second transfer halt signals 54*a* to 54*n* and the processing completion signals 48*a* to 48*n* respectively. It should be noted, however, that a clock stop signal in any of the DSP blocks 100*a* to 100*n* can be generated as a logical product of the internal transfer request signal 51 and the second transfer halt signal 54 or as a logical product of the internal transfer request signal 51 and the first transfer halt signal 34 and the second transfer halt signal 54.

As described above, the fourth embodiment implements a clock-signal control system employing DSP blocks 100*a* to 100*n* provided at a plurality of stages each comprising a data input unit, a DSP and a data output unit, wherein the supplies of the clock signals 80*a* to 80*n* to the DSP 40*a* to 40*n* are halted at the activation of the clock stop signals 82*a* to 82*n* respectively. As a result, by cutting off the supplies of the clock signals 80*a* to 80*n* to the DSPs 40*a* to 40*n* to halt the operations of the DSP 40*a* to 40*n*, the amount of power consumed thereby at that time can be reduced.

Preferred embodiments of the present invention have been described so far. It is further understood by those skilled in the art that what is described above is no more than explanation of preferred embodiments of the disclosed clock-supply control system and that a variety of changes and modifications can thus be made to the embodiments without departing from the true spirits and scopes of the present invention being indicated by the following appended claims.

What is claimed is:

1. A clock-supply control system of a digital-signal processor comprising:

a data input unit having a first buffer memory for holding incoming data;

said digital-signal processor for inputting buffered data from said first buffer memory, carrying out digital processing on said buffered data in synchronization with a clock signal supplied to said digital-signal processor and outputting processed data by outputting a transfer request signal, said digital-signal processor processing each operation of inputting said buffered data, carrying out said digital processing and outputting said processed data sequentially;

a data output unit for inputting said processed data from said digital-signal processor with timing determined by receipt of said transfer request signal from said digital-signal processor, storing said processed data in a second buffer memory, outputting a transfer halt signal for halting supply of said processed data from said digital-signal processor when an available space in said second buffer memory becomes smaller than a predetermined value and outputting said processed data stored in said second buffer memory; and a clock-signal cutoff connected to said digital-signal processor unit for cutting off supply of said clock signal to said digital-signal processor when said transfer request signal and said transfer halt signal are both received.

2. A clock-supply control system of a digital-signal processor according to claim 1 further comprising a plurality of digital signal processors wherein:

said digital-signal processors are provided between said data input unit and said data output unit, one of said digital-signal processors connected to said data input unit, another one of said digital signal processors connected to said output unit and remaining ones of said digital-signal processors connected to one another between said one and said another one of said digital-signal processors; and said digital-signal processor at each of said stages is provided with a clock-signal cutoff unit for cutting off supply of said clock signal to said digital-signal processor.

3. A clock-supply control system of a digital-signal processor according to claim 1 comprising:

digital-signal processing blocks each including said data input unit, said digital-signal processor and said data output unit; and wherein each of said digital-signal processing blocks is provided with a clock-signal cutoff unit for cutting off supply of said clock signal to said digital-signal processor in said digital-signal processing block.

4. A clock-supply control system of a digital-signal processor comprising:

a data input unit having a first buffer memory for holding incoming data;

said digital-signal processor for inputting buffered data from said first buffer memory, carrying out digital processing on said buffered data in synchronization with a clock signal supplied to said digital-signal processor and outputting processed data by outputting a transfer request signal when a first transfer halt signal supplied to said data input unit is not set at a high level, said digital-signal processor processing each operation of inputting said buffered data, carrying out said digital processing and outputting said processed data sequentially;

a data output unit for inputting said processed data from said digital-signal processor with timing determined by receipt of said transfer request signal from said digital-signal processor, storing said processed data in a second buffer memory, outputting a second transfer halt signal for halting supply of said processed data from said digital-signal processor when an available space in said second buffer memory becomes smaller than a predetermined value and outputting said processed data stored in said second buffer memory; and a clock-signal cutoff unit connected to said digital-signal processor for cutting off supply of said clock signal to said digital-signal processor when said transfer request signal, said first transfer halt signal and said second transfer halt signal are all received.

5. A clock supply control system of a digital-signal processor according to claim 4 wherein:

said digital-signal processors are provided between said data input unit and said data output unit, one of said digital-signal processors connected to said data input unit, another one of said digital signal processors connected to said output unit and remaining ones of said digital-signal processors connected to one another between said one and said another one of said digital-signal processors; and said digital-signal processor at each of said stages is provided with a clock-signal cutoff unit for cutting off supply of said clock signal to said digital-signal processor.

6. A clock-supply control system of a digital-signal processor according to claim 4 comprising:

digital-signal processing blocks each including said data input unit, said digital-signal processor and said data output unit; and wherein each of said digital-signal processing blocks is provided with a clock-signal cutoff unit for cutting off supply of said clock signal to said digital-signal processor in said digital-signal processing block.

7. A clock-supply control system of a digital-signal processor comprising:

a data input unit having a first buffer memory for holding incoming data;

said digital-signal processor for inputting buffered data from said first buffer memory, carrying out digital processing on said buffered data in synchronization with a clock signal supplied to said digital-signal processor, outputting a processing completion signal at the end of said digital processing and outputting processed data by outputting a transfer request signal when a first transfer halt signal supplied to said data input unit is not set at a high level, said digital-signal processor processing each operation of inputting said buffered data, carrying out said digital processing and outputting said processed data sequentially;

a data output unit for inputting said processed data from said digital-signal processor with timing determined by receipt of said transfer request signal from said digital-signal processor, storing said processed data in a second buffer memory, outputting a second transfer halt signal for halting supply of said processed data from said digital-signal processor when an available space in said second buffer memory becomes smaller than a predetermined value and outputting said processed data stored in said second buffer memory; and a clock-signal cutoff unit connected to said digital-signal processor for cutting off supply of said clock signal to said digital-signal processor when said second transfer halt signal, said first transfer halt signal and said processing completion signal are all received.

8. A clock-supply control system of a digital-signal processor according to claim 7 further comprising a plurality of digital signal processors wherein:

said digital-signal processors are provided between said data input unit and said data output unit, one of said digital-signal processors connected to said data input unit, another one of said digital signal processors connected to said output unit and remaining ones of said digital-signal processors connected to one another between said one and said another one of said digital-signal processors; and said digital-signal processor at each of said stages is provided with a clock-signal cutoff unit for cutting off supply of said clock signal to said digital-signal processor.

9. A clock-supply control system of a digital-signal processor according to claim 7 comprising:

digital-signal processing blocks each including said data input unit, said digital-signal processor and said data output unit; and wherein each of said digital-signal processing blocks is provided with a clock-signal cutoff unit for cutting off supply of said clock signal to said digital-signal processor in said digital-signal processing block.

10. A clock-supply control system of a digital-signal processor comprising:

a data input unit having a first buffer memory for holding incoming data;

said digital-signal processor for inputting buffered data from said first buffer memory, carrying out digital processing on said buffered data in synchronization with a clock signal supplied to said digital-signal processor, outputting a processing completion signal at the end of said digital processing and outputting processed data by activating a transfer request signal when a first transfer halt signal supplied to said data input unit is not set at a higher level, said digital-signal processor having a second buffer memory comprising an input buffer area, a processing buffer area and an output buffer area, and said digital-signal processor performing each operation of inputting said buffered data, carrying out digital processing on said buffered data and outputting said processed data to be processed simultaneously;

a data output unit for inputting said processed data from said digital-signal processor with timing determined by receipt of said transfer request signal from said digital-signal processor, storing said processed data in a third buffer memory, outputting a second transfer halt signal for halting supply of said processed data from said digital-signal processor when an available space in said third buffer memory becomes smaller than a predetermined value and outputting said processed data stored in said third buffer memory; and a clock-signal cutoff unit connected to said digital-signal processor for cutting off supply of said clock signal to said digital-signal processor when said transfer halt signal, said first transfer halt signal and said processing completion signal are all received.

11. A clock-supply control system of a digital-signal processor according to claim 10 further comprising a plurality of digital signal processors wherein:

said digital-signal processors are provided between said data input unit and said data output unit, one of said digital-signal processors connected to said data input unit, another one of said digital signal processors connected to said output unit and remaining ones of said digital-signal processors connected to one another between said one and said another one of said digital-signal processors; and said digital-signal processor at each of said stages is provided with a clock-signal cutoff unit for cutting off supply of said clock signal to said digital-signal processor.

12. A clock-supply control system of a digital-signal processor according to claim 1 comprising:

digital-signal processing blocks each including said data input unit, said digital-signal processor and said data output unit; and wherein each of said digital-signal processing blocks is provided with a clock-signal cutoff unit for cutting off supply of said clock signal to said digital-signal processor in said digital-signal processing block.

* * * * *